3,249,597
MONO AZO DYES CONTAINING A
PYRIDINE-1-N-OXIDE
Joseph W. Dehn, Jr., Great Neck, and Anthony J. Salina, New York, N.Y., assignors to Interchemical Corporation, New York, N.Y., a corporation of Ohio
No Drawing. Filed July 29, 1963, Ser. No. 298,406
6 Claims. (Cl. 260—156)

This invention relates to azo dyes made from 2-amino-5-nitropyridine-1-N-oxide. More particularly it relates to compounds having the formula

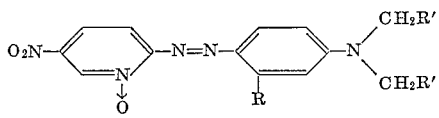

wherein R is selected from the group consisting of H, $CH_3$, $C_2H_5$, $OCH_3$, and $OC_2H_5$, and R' is selected from the group consisting of $CH_3$, $C_2H_5$, $CH_2OH$, and $CH_2CN$.

These new azo dyes are strong blues and violets with very good affinity for cellulose acetate, having excellent buildup. In general they have more affinity for cellulose acetate fiber than for Dacron (polyester) fiber.

The pyridine intermediate is conveniently prepared by reacting 2-amino-5-nitropyridine with acetic anhydride and treating the product with peracetic acid. Hydrolysis with hydrochloric acid followed by neutralization of the acid yield the 2-amino-5-nitropyridine-1-oxide.

The notable difference between these compounds and analogous ones having a benzene nucelus in place of a pyridine nucleus, e.g.,

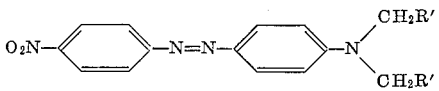

is that the dyes of this invention have strong resistance to sublimation, while the above carbocyclic variants are extremely vulnerable to sublimation where R' does not encompass polar groups, and all the carbocyclic types have much poorer wash resistance than the dyes of this invention. The carbocyclic types are all red or orange.

The attempted diazotization of 2-amino-5-nitropyridine-1-N-oxide in aqueous hydrochloric acid or concentrated sulfuric acid was unsuccessful, but it was found that diazotization in 85% phosphoric acid was entirely satisfactory.

Synthesis of the carbocyclic azo dyes, for comparison, was accomplished by diazotization of p-nitroaniline in hydrochloric acid with sodium nitrate at 0° C., followed by direct coupling in aqueous medium.

Synthesis of 2-acetylamino-5-nitropyridine 27.8 g. (0.20 mole) of 2-amino-5-nitropyridine were added to 40.06 ml. (0.42 mole) of acetic anhydride and refluxed 1 hour. The solution was cooled to 130° C. and then poured onto 200 g. of ice and water mixture. The product crystallized out. The suspension was stirred 1½ hours at room temperature, filtered, washed free from acid with water, and dried overnight at 50° C. Recrystallization from 1500 ml. of methanol gave fine, light brown crystals having a melting point of 194–196° C.
Analysis showed—Calculated: C=46.4%, H=3.87%, N=23.2%.
Found: C=47.64%, H=4.19%, N=22.58%.

Synthesis of 2-acetylamino-5-nitropyridine-N-oxide 27.15 g. (0.15 mole) of 2-acetylamino-5-nitropyridine were added to a mixture of 29.9 ml. of acetic acid and 24.9 ml. (0.15 mole) of 40% peracetic acid. The batch was slowly heated up to 70° C. and held at 69–73° C. for 3 hours. The batch was brought down to room temperature and the acetic acid of reaction was removed under reduced pressure. The product was collected, slurried with a minimal amount of water, filtered, washed free from acid with water, and dried overnight at 50° C. 18.14 g. of crude, recrystallized from 300 ml. toluene, yielded golden yellow crystals having melting point of 196–197° C.
Analysis showed—Calculated: C=42.68%, H=3.55%, N=21.30%.
Found: C=43.20%, H=3.97%, N=20.83%.

Synthesis of 2-amino-5-nitropyridine-N-oxide 3.94 g. (0.02 mole) of 2-acetylamino-5-nitropyridine-N-oxide were added to a solution of 6.0 g. of 36.5% hydrochloric acid in 5.10 g. of water. The temperature was slowly brought up to the reflux point and held there 2 hours. After being cooled to room temperature, the mixture was neutralized with sodium bicarbonate, filtered, washed with a minimum amount of water, and dried overnight at 50° C. Recrystallization of the crude product from 100 ml. of water yielded yellow crystals melting at 245–246° C.
Analysis showed—Calculated: C=38.7%, H=3.25%, N=27.10%.
Found: C=39.0%, H=2.95%, N=26.80%.

EXAMPLE 1

Synthesis of 4-(5'-nitro-2'-pyridylazo-1'-N'-oxide)-N,N-di-beta-hydroxyethyl-aniline 6.20 g. (0.04 mole) of 2-amino-5-nitropyridine-N-oxide were dissolved by heating to 60° C. in 100 ml. of 85% phosphoric acid. Sodium nitrite (3.04 g.) was added to the solution over a half hour period at −20° C. and stirring was continued at −20° C. for 1½ hours. The batch was added as quickly as possible to a solution containing 7.24 g. (0.04 mole) of N,N-di-beta-hydroxyethyl-aniline in 140 ml. of 95% ethyl alcohol at −10° C. The mixture was stirred at −15° C. for 3 hours, 126 g. of sodium acetate were added at −15 to −5° C. The material was then drowned in 200 ml. of water, stirred for a short time, filtered, washed with water and dried overnight at 50–55° C. The crude had a melting point of 197–198° C. Recrystallization from ethyl alcohol gave blue green metallic crystals having a melting point of 201° C.
Analysis showed—Calculated: C=51.89%, H=4.9%, N=20.19%.
Found: C=51.59%, H=5.69%, N=17.40%.

EXAMPLE 2

*Synthesis of 4-(5'-nitro-2'-pyridylazo-1'-N'-oxide)-3-methyl-N,N-di-beta-hydroxy-ethylaniline*

3.10 g. (0.02 mole) of 2-amino-5-nitropyridine-N-oxide were dissolved in 50 ml. of 85% phosphoric acid by heating at 50° C. With the solution at −12 to −14° C., sodium nitrite (1.52 g.) was added over a half-hour period. Stirring was continued at −10° C. for 40 minutes more. The batch was added as quickly as possible to a solution of 3.9 g. (0.02 mole) of N,N-di-beta-hydroxyethyl-m-toluidine in 68 ml. of 98% formic acid and 1.5 ml. of 97% sulfuric acid at 4° C. It was stirred at −6° C. for 3½ hours and 103 g. of sodium acetate added. Stirring was continued at 0 to 5° C. for another hour. The material was then drowned in 500 ml. of water and ice mixture, stirred overnight, filtered, washed salt free with water, and dried overnight at 50° C. Recrystallization from 40 ml. of toluene gave metallic green crystals melting at 160–163° C. with decomposition.

Analysis showed—Calculated: C=53.20%, H=5.26%, N=19.40%. Theory: C=52.60%, H=4.67%, N=18.63%.

EXAMPLE 3

*Synthesis of 4-(5'-nitro-2'-pyridylazo-1'-N'-oxide)-N-beta-hydroxyethyl-N-beta-cyanoethylaniline*

6.20 g. (0.04 mole) of 2-amino-5-nitropyridine-N-oxide were dissolved in 100 ml. of 85% phosphoric acid by heating to 55° C. Sodium nitrite (3.04 g.) was then added over a half-hour period at −20° C. and the batch was stirred at −20° C. for 3 hours more. The mixture was added as quickly as possible to a solution of 7.68 g. (0.04 mole) of N-beta-hydroxyethyl-N-beta cyanoethyl-aniline in 140 ml. of 95% ethyl alcohol at −10° C. The batch was stirred ½ hour at −10° C. and 1½ hours more at −20° C. and then 126 g. of sodium acetate added. The material was stirred overnight at −10° C., filtered and the residue containing salt slurried several times with water. Filtration of the slurry left a tarry residue having a green metallic luster. Crystallization of the residue from 180 ml. benzene solution was effected by precipitation with 100–110 ml. of cyclohexane, yielding blue crystals melting at 124–126° C. with decomposition.

EXAMPLE 4

*Synthesis of 4-(5'-nitro-2'-pyridylazo-1'-N'-oxide)-N,N-diethylaniline*

4.65 g. (0.03 mole) of 2-amino-5-nitropyridine-N-oxide were dissolved in 100 ml. of 85% phosphoric acid by heating to 55° C. 2.28 g. of sodium nitrite were then added over a 20-minute period at −20° C. and the mixture was stirred at that temperature for 1½ hours more. The batch was added as quickly as possible to a solution of 4.47 g. (0.03 mole) of N,N-diethylaniline in 140 ml. of ethyl alcohol at −20° C. After the material was stirred 2½ hours at −25° C., there were added 63 g. of sodium acetate, 100 ml. of ice cold water, and again 63 g. of sodium acetate. Stirring was continued overnight at −10° C. The product was filtered, washed with water, and dried overnight at 50–55° C. Two recrystallizations from toluene gave crystals melting at 154–156° C.

Analysis showed 21.1% N compared with 22.21% called for by theory.

EXAMPLE 5

*Synthesis of 4-(5'-nitro-2'-pyridylazo-1'-N'-oxide)-3-methyl-N,N-diethylaniline*

3.10 g. (0.02 mole) of 2-amino-5-nitropyridine-N-oxide were dissolved in a mixture of 40 ml. of 85% phosphoric acid and 20 ml. of concentrated nitric acid by stirring. Sodium nitrite (1.52 g.) was then added over a half-hour period at −8° C. and the mixture stirred at −8° C. for 3½ hours more. The batch was added, in portions, over a half-hour period to a solution 3.26 g. (0.02 mole) of N,N-diethyl-m-toluidine and 16.12 g. of sodium acetate in 70 ml. of absolute alcohol and 30 ml. of water at −3 to −8° C. An additional 16.12 g. of sodium acetate were added and the material stirred 2 hours more at 0° C. It was then neutralized, filtered, washed free from salt with water, and dried overnight at 50° C. Recrystallization from a mixture of benzene and cyclohexane gave fine crystals melting at 152–154° C. with decomposition.

Analysis showed—Calculated: C=58.38%, H=5.78%, N=21.25%. Found: C=58.92%, H=5.90%, N=19.45%.

EXAMPLE 6

*Synthesis of 4-(5'-nitro-2'-pyridylazo-1'-N'-oxide)-3-ethoxy-N,N-diethylaniline*

4.65 g. (0.03 mole) of 2-amino-5-nitropyridine-N-oxide were dissolved in 100 ml. of 85% phosphoric acid by heating to 55° C. Sodium nitrite (2.28 g.) was then added over a 10-minute period at −20° C. and the mixture was stirred at this temperature 1½ hours more. The batch was added as quickly as possible to a solution of 5.8 g. (0.03 mole) of N,N-diethyl-m-phenetidine in 140 ml. of 95% ethyl alcohol at −25° C. to −30° C. Stirring was continued 3 hours at −25° C. 126 g. of sodium acetate were added at −25° C., then 200 ml. of ice cold water and stirring continued at −10° C. for a short time. 200 ml. of 29% ammonium hydroxide were added and after being stirred ½ hour more the product was filtered, washed with water, and dried at 50–55° C. overnight. Recrystallization from a mixture of benzene and cyclohexane gave crystals melting at 147–149° C. with decomposition.

Analysis showed—Calculated: C=56.87%, H=5.81%, N=19.5%. Found: C=55.17%, H=5.58%, N=19.13%.

When dyed on cellulose acetate the colors given by the dyes in these examples were as follows

| Example No.: | Color |
|---|---|
| 1 | blue violet |
| 2 | blue violet |
| 3 | red violet |
| 4 | blue violet |
| 5 | strong blue |
| 6 | navy blue |

What is claimed is:
1. The compound

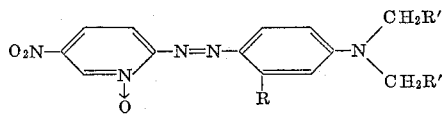

wherein R is selected from the group consisting of H, CH$_3$, C$_2$H$_5$, OCH$_3$, and OC$_2$H$_5$ and R' is selected from the group consisting of CH$_3$, C$_2$H$_5$, CH$_2$OH, and CH$_2$CN.

2. The compound

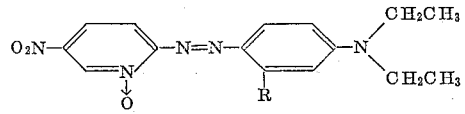

wherein R is selected from the group consisting of H, CH$_3$, C$_2$H$_5$, OCH$_3$, and OC$_2$H$_5$.

3. The compound

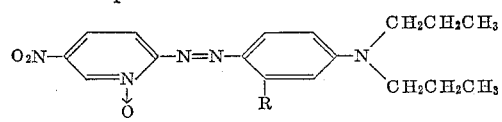

wherein R is selected from the group consisting of H, CH$_3$, C$_2$H$_5$, OCH$_3$, and OC$_2$H$_5$.

4. The compound

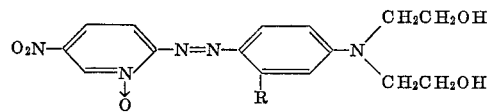

wherein R is selected from the group consisting of H, $CH_3$, $C_2H_5$, $OCH_3$, and $OC_2H_5$.

5. The compound

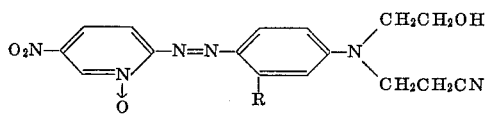

wherein R is selected from the group consisting of H, $CH_3$, $C_2H_5$, $OCH_3$, and $OC_2H_5$.

6. The compound

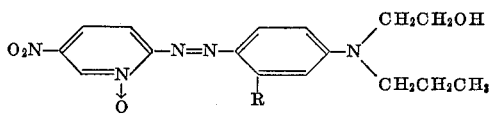

wherein R is selected from the group consisting of H, $CH_3$, $C_2H_5$, $OCH_3$, and $OC_2H_5$.

References Cited by the Examiner

UNITED STATES PATENTS 3,051,997   8/1962   Lewis et al. _____ 260—156

CHARLES B. PARKER, *Primary Examiner.*

REYNOLD J. FINNEGAN, DONALD M. PAPUGA,
*Assistant Examiners.*